INVENTORS
CHRISTOPHER R. COOMBES
GEOFFREY W. SCHOLES

United States Patent Office 3,582,300
Patented June 1, 1971

3,582,300
METHOD OF MANUFACTURING SEMICONDUCTOR CONTAINERS
Christopher Robert Combes, Bartley, and Geoffrey William Scholes, Eastleigh, England, assignors to U.S. Philips Corporation, New York, N.Y.
Filed June 28, 1968, Ser. No. 740,926
Claims priority, application Great Britain, July 25, 1967, 34,170/67
Int. Cl. C03c 27/02
U.S. Cl. 65—31                                      5 Claims

ABSTRACT OF THE DISCLOSURE

This method of manufacturing a semiconductor container which is comprised of a cylindrical metal can having a glass window at one end involves the steps of placing a solid glass preform in an open ended metal can and causing the solid glass preform to become molten glass by placing the metal can in a heated atmosphere. The can with the solid glass preform is placed in a mould jig in which the jig has a lens formed cavity at its base so that when the glass becomes molten it will flow into the cavity to form the proper window. After the combination is cooled a hermetic seal is established between the glass and the metal can. Subsequently the glass window is reheated to a temperature above the softening temperature and below the working temperature so that it may become thermally polished.

---

This invention relates to methods of manufacturing semiconductor device containers comprising a cylindrical metal can having a glass window at one end thereof. Such containers are commonly employed in semiconductor photo-devices, for example photo-diodes and photo-transistors, and at a late stage in the manufacture of such devices are sealed on a so-called "header" part on which the active semiconductor body is located. The invention relates particularly, but not exclusively, to methods of manufacturing such containers in which the glass window is in the form of a lens, the external surface of the window having a predetermined contour, for example of convex form. These containers are generally referred to as lens cans.

In the manufacture of a lens can there are two important requirements, these being that the glass forms a good hermetic seal with the can at the end thereof and that the external surface of the glass is free of imperfections.

According to the invention a method of manufacturing a semiconductor device container comprising a cylindrical metal can having a glass window at one end thereof, comprises the steps of placing a quantity of glass inside an open ended cylindrical metal can and heating in a mould jig to form a hermetic seal between the glass and the internal wall at one end of the can and to mould glass at the said end of the can into a window having an external surface contour determined by the mould, removing the assembled can and glass window from the mould jig and thereafter heating to a temperature greater than the softening point and less than the working point of the glass to thermally polish the external surface of the glass window.

In this method surface imperfections in the external surface of the glass window are substantially eliminated a suitable hermetic seal between the glass and the internal wall of the can is maintained.

In one form of the method the glass window is formed as a lens having a convex external surface.

The quantity of glass initially placed in the can may consist of a solid glass preform. During heating in the mould jig a removable weight may be present on the glass preform to urge the molten glass into the mould and also to define the internal surface of the glass window.

Reference herein to the softening point of a glass is to be understood to mean a temperature at which the viscosity of the glass is approximately $10^{7.6}$ poises. The working point of a glass is the temperature at which the viscosity of the glass is $10^4$ poises.

One embodiment of a method according to the invention will now be described, by way of example, with reference to the accompanying diagrammatic drawings, in which.

Figure 1:
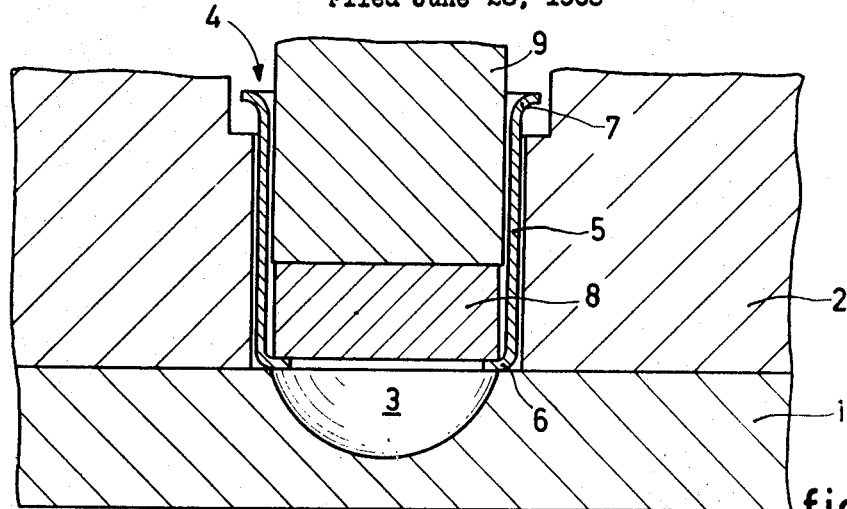
FIG. 1 shows in section a metal can containing a glass preform loaded in a mould jig.

Referring now to FIG. 1 there is shown a graphite mould jig comprising a base part 1 and a body portion 2. The mould jig is suitable for forming a plurality of semiconductor device containers but is only shown in part and the manufacture of one such container at one position in the jig will be described. The base part 1 comprises a plurality of cavities each having concave mould surfaces 3 and the body portion 2 comprises a plurality of apertures 4 located above and in registration with the cavities. In each aperture 4 there is located an open ended cylindrical can 5 consisting of a nickel/iron/cobalt alloy available commercially under the trade name NILO-K. The can 5 has an inwardly extending flange 6 at the end situated lowermost which rests on a surface of the base part 1 of the mould jig adjacent to the periphery of the mould surface 3. At the other end of the can there is an outwardly extending flange 7, the can and flange 7 in this case being constructed having dimensions suitable for sealing on a semiconductor device header of the TO-18 outline.

A cylindrical glass preform 8 consisting of glass having an expansion coefficient matched to that of the can 5, for example glass available commercially under the trade name KODIAL, is placed in the can 5. The preform 8 has a diameter slightly smaller than the internal diameter of the can 5. Prior to insertion in the can 5, which has previously been degreased and decarburised for 1 hour in a nitrogen and hydrogen (12.5%) mixture at 1100° C., the glass preform 8 is etched in a hydrofluoric acid solution (25%). A cylindrical weight 9 of graphite having a diameter slightly smaller than the can 5 is placed inside the can and sits on the glass preform 8 as is shown in FIG. 1.

The loaded mould jig containing a large plurality of metal cans 5 each containing a glass preform 8 and a graphite weight 9 is placed in a travelling belt furnace. The mould jig travels through the furnace for a period of approximately 80 minutes, the jig being located in three heated zones at 860° C., 960° C. and 1030° C., respectively, for a total time of approximately 15 to 20 minutes and thereafter passes to a cold zone. An atmosphere of nitrogen is maintained in the furnace. During this heat treatment the glass preform melts and flows, under the pressure exerted on the molten glass by the weight 9, into the cavity in the base part 1 of the mould jig.

On subsequent cooling of the mould jig and contents the glass solidifies to form a hermetic seal with the internal wall of the can 5 adjacent the flange 6 and a glass window 9 in the form of a lens extending beyond the flange 6 having a convex external surface 10 corresponding to the mould surface 3.

Figure 2:
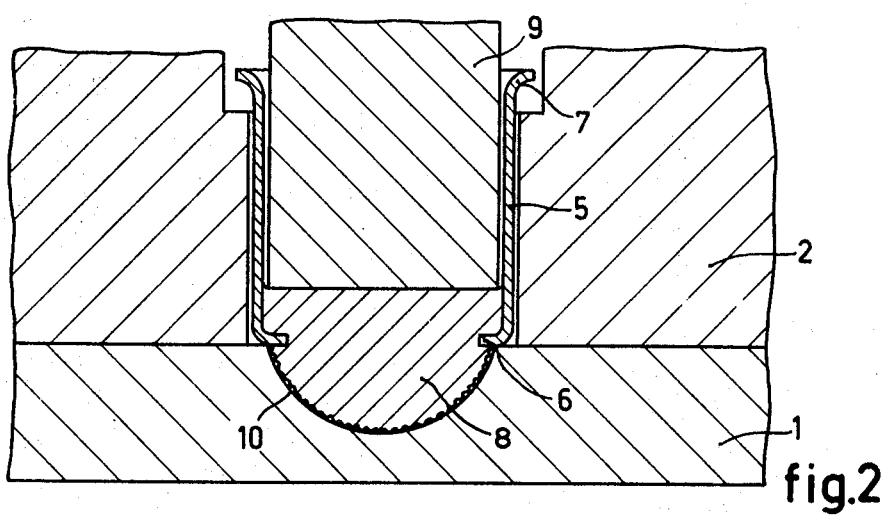
FIG. 2 shows in section the metal can in the mould jig after moulding the glass preform into a window.
Figure 3:
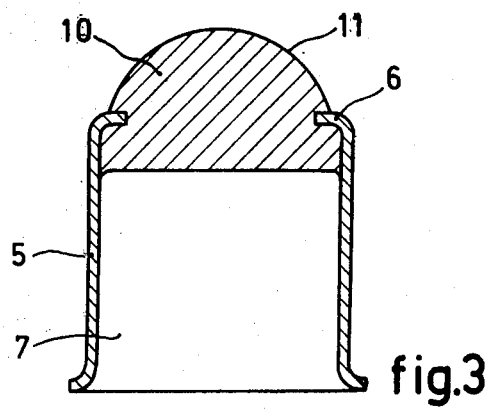
FIG. 3 shows the metal can with the glass window after a further heat treatment.

The lens 5, 9 so formed is shown in the mould jig in FIG. 2. It is found that the convex external surface 10 has many imperfections as is indicated in FIG. 2. The lens cans 5, 9 are removed from the mould jig and the surface of the glass window 9 is cleaned of graphite and other impurities by tumbling in methylated spirits for 10 minutes and then etched in hydrofluoric acid (25%), the latter step being carried out in an ultrasonic agitation bath.

A plurality of the lens cans 5, 9 are then placed in a further jig with the glass window 9 uppermost and exposed. This jig is placed in a furnace and heating in a hydrogen (12.5%) and nitrogen atmosphere is effected at 850° C. for approximately 9 minutes. During this heating step, which is carried out at a temperature above the softening point of the glass only the surface of the glass flows. The window retains it profile due to the thermal mass of the glass maintaining a temperature just sufficient to hold the viscosity of the glass at a level which avoids deformation. Thus thermal polishing of the external surface 10 of the glass window 9 occurs while the hermetic seal between the glass and the internal wall of the can 5 is preserved on subsequent cooling.

The lens can is completed by electro-plating the metal can 5 with a nickel layer of 2 to 3 microns thickness.

What is claimed is:

1. A method of manufacturing a semiconductor device container comprising a cylindrical metal can having a glass window at one end thereof, comprising the steps of degreasing and decarburizing in a heated nitrogen/hydrogen mixture an open ended cylindrical metal can, etching a glass preform having a diameter smaller than said metal can in an acid solution, locating said open ended cylindrical metal can in a mould jig, placing of said glass preform inside said open ended cylindrical metal can, heating said mould jig and can/glass combination in a nitrogen atmosphere by passing it through three heated zones having a temperature range of from 860° C. to 1030° C. so that said glass preform becomes molten so as to flow into a cavity at the base of the mould jig, cooling said mould jig so as to solidify said glass to form a hermetic seal between the glass and the internal wall at one end of the can and to mould glass at the said end of the can into a window having an external surface contour determined by the mould, removing the assembled can and glass window from the mould jig cleaning said glass window, heating said glass window in a hydrogen/nitrogen atmosphere to a temperature greater than the softening point and less than the working point of the glass to thermally polish the external surface of the glass window.

2. A method as claimed in claim 1, in which the glass window is formed as a lens having a convex external surface.

3. A method as claimed in claim 1, in which during heating in the mould jig a removable weight is present on the glass preform to urge the molten glass into the mould and define the internal surface of the glass window.

4. A method as claimed in claim 1 in which the cleaning of the glass window is carred out by tumbling in methylated spirits and then etching said window in an ultrasonic agitation bath of hydrofluoric acid.

5. A method as claimed in claim 4 further comprising a final step of depositing a layer of nickel on the metal can.

References Cited

UNITED STATES PATENTS

| 2,026,606 | 1/1936 | Bausch | 65—37X |
| 3,288,585 | 11/1966 | Clarke | 65—37 |
| 3,464,805 | 9/1969 | Landron, Jr. | 65—59X |

FOREIGN PATENTS

| 860,434 | 2/1961 | Great Britain | 65—37 |

ARTHUR D. KELLOGG, Primary Examiner

U.S. Cl. X.R.

65—39, 59

UNITED STATES PATENT OFFICE
CERTIFICATE OF CORRECTION

Patent No. 3,582,300           Dated  June 1, 1971

Inventor(s)  Christopher Robert Coombes et al.

It is certified that error appears in the above-identified patent and that said Letters Patent are hereby corrected as shown below:

Column 1, line 65, after "eliminated" insert -- while --.

Signed and sealed this 1st day of August 1972.

(SEAL)
Attest:

EDWARD M.FLETCHER,JR.                ROBERT GOTTSCHALK
Attesting Officer                    Commissioner of Patents

PO-1050
(5/69)

UNITED STATES PATENT OFFICE
CERTIFICATE OF CORRECTION

Patent No. 3,582,300              Dated   June 1, 1971

Inventor(s)   CHRISTOPHER R. COOMBES ET AL

It is certified that error appears in the above-identified patent and that said Letters Patent are hereby corrected as shown below:

Col. 2, line 66,  "9"   should be --10--;

line 67,  "10"  should be --11--;

line 69,  "9"   should be --10--;

line 70,  "10"  should be --11--;

Col. 3, line 1,   "9 are"  should be --10 is--;

line 2,   "9"   should be --10--;

line 6,   "9"   should be --10--;

line 7,   "9"   should be --10--;

line 16,  "10"  should be --11--; "9" should be --10--.

Signed and Sealed this 28th day of November    1972.

(SEAL)
Attest:

EDWARD M. FLETCHER, JR.                ROBERT GOTTSCHALK
Attesting Officer                      Commissioner of Patents